United States Patent [19]

Kitagawa

[11] 4,179,230

[45] Dec. 18, 1979

[54] MULTIPLE SPINDLE DRILLING MACHINE FOR WIDE FLANGE BEAMS

[75] Inventor: Toshikatsu Kitagawa, Seki, Japan

[73] Assignee: Miyakawa Industry Company Limited, Gifu, Japan

[21] Appl. No.: 875,299

[22] Filed: Feb. 6, 1978

[51] Int. Cl.² .................. B23B 41/00; B23B 39/22
[52] U.S. Cl. .................................. 408/39; 408/41; 408/46; 408/52
[58] Field of Search ............... 408/37, 39, 40, 41, 408/42, 53, 52, 87, 88, 46, 108, 109, 234, 69, 70, 103

[56] References Cited

U.S. PATENT DOCUMENTS

| | | | |
|---|---|---|---|
| 613,225 | 10/1898 | Pearson | 408/39 |
| 2,956,453 | 10/1960 | Frankenfield et al. | 408/70 X |
| 3,090,261 | 5/1963 | Hill | 408/70 X |
| 3,094,015 | 6/1963 | Mead | 408/50 X |
| 3,372,609 | 3/1968 | Wingne | 408/70 X |
| 3,687,563 | 8/1972 | McConnell | 408/39 |
| 3,977,804 | 8/1976 | Kitagawa | 408/39 X |
| 4,030,853 | 6/1977 | Mizen | 408/52 X |
| 4,090,803 | 5/1978 | Haley | 408/103 X |

*Primary Examiner*—Horace M. Culver
*Attorney, Agent, or Firm*—George B. Oujevolk

[57] ABSTRACT

A multiple spindle drilling machine for wide flange beams comprising at least a pair of wide flange beam supporting rollers for setting and supporting both the flanges of a wide flange beam, respectively, in a cantilevering manner at the drilling position of the wide flange beam, at least a pair of gripping members for gripping the wide flange beam from both the sides thereof so that the beam is not moved, a plurality of drills disposed so that they can move in the lateral direction and the widthwise direction of the wide flange beam for drilling the wide flange beam, and a device for moving at least one of said wide flange beam supporting rollers, said gripping members and said drills integrally in the widthwise direction of the wide flange beam.

7 Claims, 23 Drawing Figures

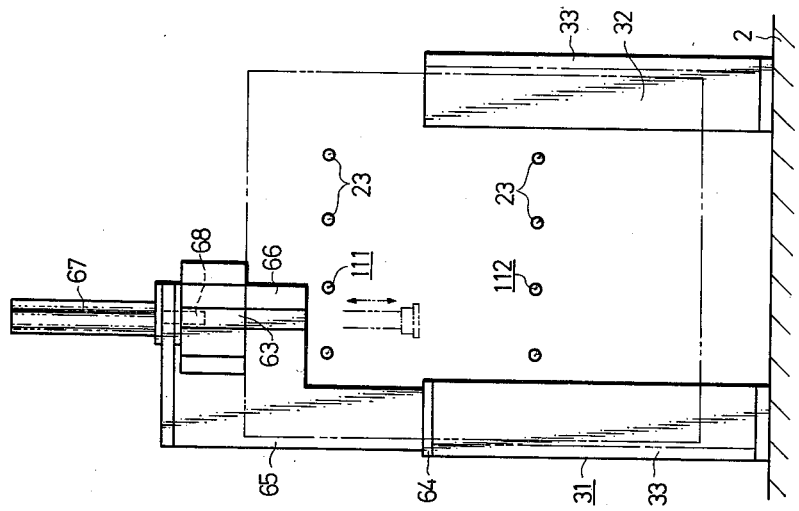
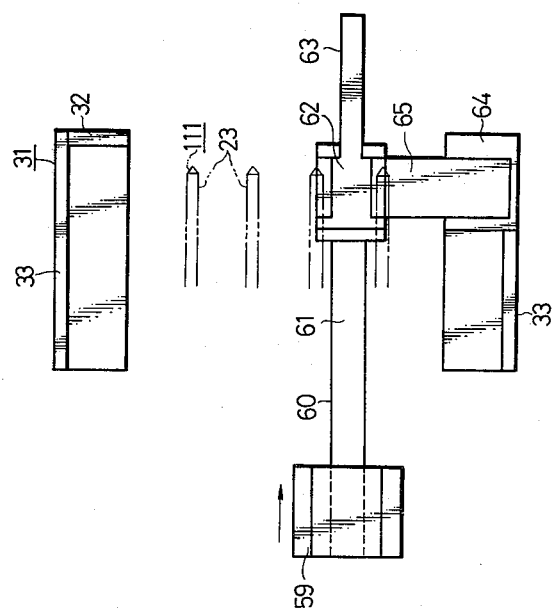

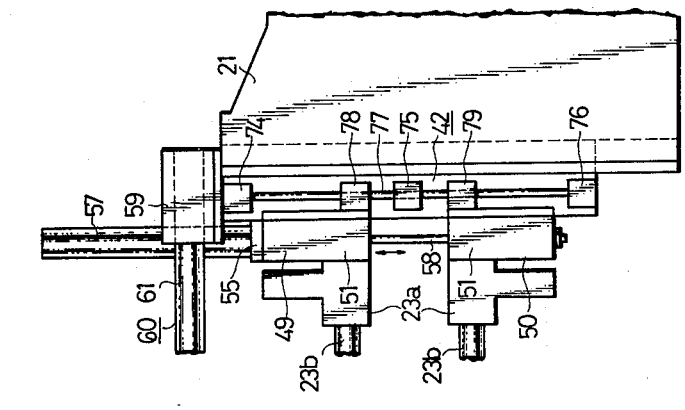
FIG.10(b)
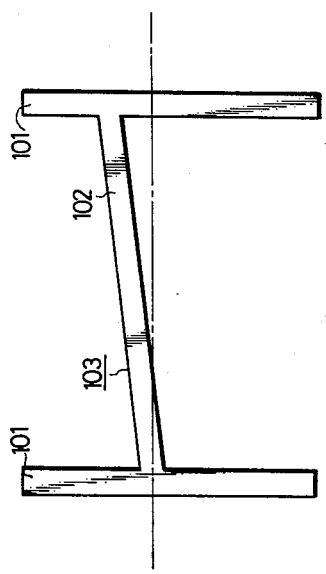
FIG.13
FIG.10(a)

MULTIPLE SPINDLE DRILLING MACHINE FOR WIDE FLANGE BEAMS

FIELD OF THE INVENTION

The present invention relates to a multiple spindle drilling machine for wide flange beams.

OBJECTS OF THE INVENTION

It is a primary object of the present invention to provide a multiple spindle drilling machine for wide flange beams, according to which discharge of drill dusts formed at the operation of drilling a wide flange beam can be facilitated and the moving stroke of drills at the step of drilling the flanges of the wide flange beam can be shortened.

Another object of the present invention is to provide a multiple spindle drilling machine for wide flange beams, according to which wide flange beam supporting rollers, gripping members and drills can be simultaneously moved by one moving means.

Still another object of the present invention is to provide a multiple spindle drilling machine for wide flange beams, according to which the structure of shifting means for moving wide flange beam supporting rollers, gripping members and drills can be simplified.

A further object of the present invention is to provide a multiple spindle drilling machine which includes a delivery device capable of facilitating feeding of a wide flange beam to a drilling position.

A still further object of the present invention is to provide a multiple spindle drilling machine for wide flange beams which includes an auxiliary clamp mechanism capable of preventing assuredly deviation of a wide flange beam in the widthwise direction thereof at the drilling operation and of positioning the wide flange beam precisely and assuredly.

Other objects of the present invention will be apparent from embodiments illustrated hereinafter and be clearly set forth in the appended claims, and various advantages not specifically mentioned in the specification will be apparent to those skilled in the art when the present invention is worked.

BRIEF DESCRIPTION OF THE DRAWING

FIG. 4-(b) is a partial side view illustrating the state of attachment of a right gear box to a guide rail and a sliding member.

FIGS. 8 and 9 are partially cut-out plan and side views of the main portion shown in FIG. 3.

FIGS. 10-(a) and 10-(b) are partial front and back views showing the operation state of a device for adjusting the vertical positions of drills.

FIG. 13 is a front view of a wide flange beam in which the web is not horizontal.

DETAILED DESCRIPTION OF THE PREFERRED EMBODIMENTS

The present invention will now be described in detail by reference to embodiments illustrated in the accompanying drawing.

Figure 3:
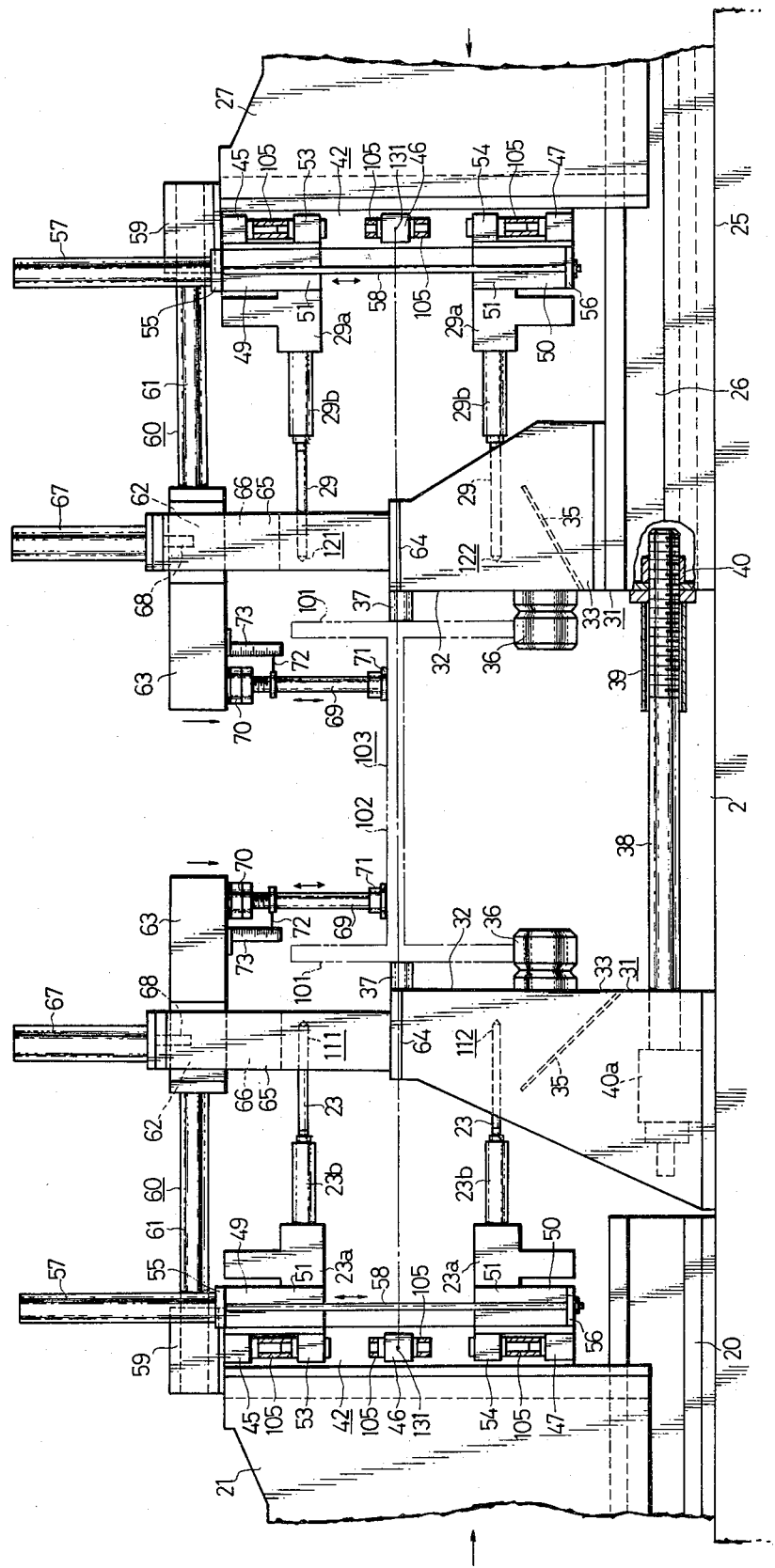
FIG. 3 is a front view showing the main portion of the drilling machine of the present invention shown in FIG. 1.

Reference numeral 1 represents a machine stand mounted on a bed 2, and a number of supporting rollers 4, each having a guiding bulged portion 3 projected on the outer periphery at the left end part, are freely rotatably attached to the top of the machine stand 1. As shown in FIG. 3, a wide flange beam 103 comprising a pair of parallel flanges 101 and a web 102 connecting these flanges 101 at central parts thereof is supported in the horizontal state by these rollers 4.

An attachment frame 5 is vertically disposed on the right side of the machine stand 1 so that it can be moved to the left and right, and a guide roller 6 is vertically mounted on the attachment frame 5 freely rotatably so that the beam 103 on the rollers 4 can be guided cooperatively with the bulged portions of the rollers 4.

A supporting frame 7 including an upper frame portion 8 and a lower frame portion 9 is vertically disposed on the top face of the rear end portion of the bed 2. A passage hole 10 allowing passage of the wide flange beam 103 is formed to pierce the lower frame portion 9 in the front-rear direction, and a plurality of supporting rollers 11 are freely rotatably attached to the bottom face of said passage hole 10 on the same height as that of the supporting rollers 4. These supporting rollers 11 are not disposed in portions corresponding to drills 18 on the lower face of a vertical gear box 17 described hereinafter.

A gate-like attachment frame 12 is mounted on the front portion of the bed 2 to straddle the machine stand 1, and a pair of hydraulic cylinders 13 attached to the lower face of a lateral frame portion 14 of the attachment frame 12 and the lower frame portion 9 of the supporting frame 7, respectively, so that their positions can be adjusted in the left-right direction. A pressing member 15 is attached to the top end of the rod of each cylinder 13 to press and fix the central part of the top face of the web 102 of the wide flange beam 103.

A hydraulic cylinder 16 is attached to the upper portion of the front face of the upper frame portion 8 of the supporting frame 7 to vertically move the vertical gear box 17 mounted on the front face of the upper frame portion 8 of the supporting frame 7. A plurality of drills 18 are dismountably attached to the lower face of the rear portion of the gear box 17, so that their attachment position can be adjusted. Further, these drills 18 are arranged so that they are simultaneously driven and rotated through the vertical gear box 17 by a motor 19 fixed to the front face of the vertical gear box 17.

A moving device 104 is disposed on the front portion of the left side of the machine stand 1 to move the wide flange beam 103 in the front-rear direction.

Figure 4A:
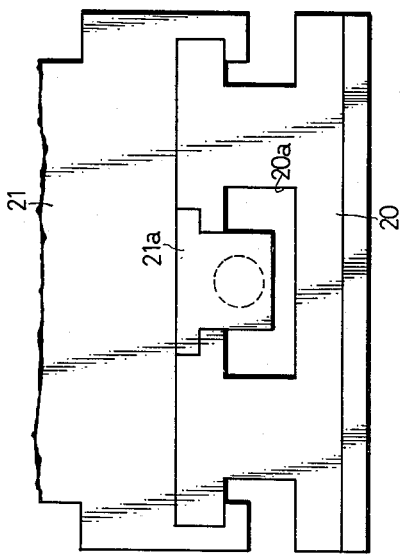
FIG. 4-(a) is a partial side view illustrating the state of attachment of a left gear box to a guide member.
Figure 4B:
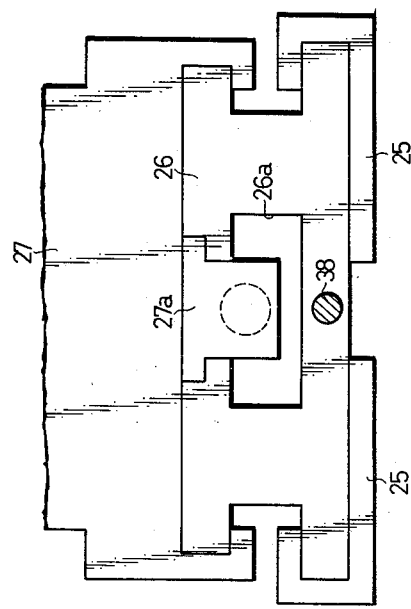

A guide member 20 extending in the left-right direction is attached to the upper left side of the bed 2 at a position corresponding to the position of the vertical gear box 17 attached to the upper frame portion 8. A groove 20a is formed on the top face of the guide member 20 to extend in the longitudinal direction, as shown in FIG. 4-(a). A left gear box 21 is mounted on the guide member 20 while an attachment portion 21a thereof is projected in the groove 20a, and it can be moved to the left and right along the guide member 20 by the rod of a hydraulic cylinder 22 fixed to the left end of the guide member 20.

A plurality of drills 23 arranged in upper and lower two rows 111 and 112 are mounted on the right side face of the gear box 21 so that their positions can be adjusted in both the vertical direction and the front-rear direction through a device for adjusting vertical positions of drills, described hereinafter, a holding member 23a and a drill-fitting spindle 23b and these drills 111 and 112 are simultaneously driven and rotated by a motor 24 fixed to the top face of the left gear box 21.

A pair of guide rails 25 extending in the left-right direction as well as the guide member 20 of the left gear box 21 are mounted on the upper right side of the bed 2 at a position corresponding to the position of the guide member 20 and each guide rail 25 supports thereon a slide member 26 having the same shape as that of the guide member 20 so that the slide member 26 can slide to the left and right. A groove 26a is formed on the top face of the slide member 26 to extend in the longitudinal direction, as shown in FIG. 4-(b). A right gear box 27 having an attachment portion 27a thereof projected from the lower face into the groove 26a is mounted on the slide member 26 so that it can be slid to the left and right with respect to the slide member 26 by the rod of a hydraulic cylinder 28 fixed to the right end of the slide member 26.

A plurality of drills 29 arranged in upper and lower two rows 121 and 122 are mounted on the left side face of the right gear box 27 so that their positions can be adjusted in both the vertical direction and the front-rear direction in correspondence to the above-mentioned drills 23 through a device for adjusting vertical positions of drills, described hereinafter, a holding member 29a and a drill-fitting spindle 29b. These drills 121 and 122 are simultaneously driven and rotated by a motor 30 fixed to the top face of the right gear box 27.

Figure 1:
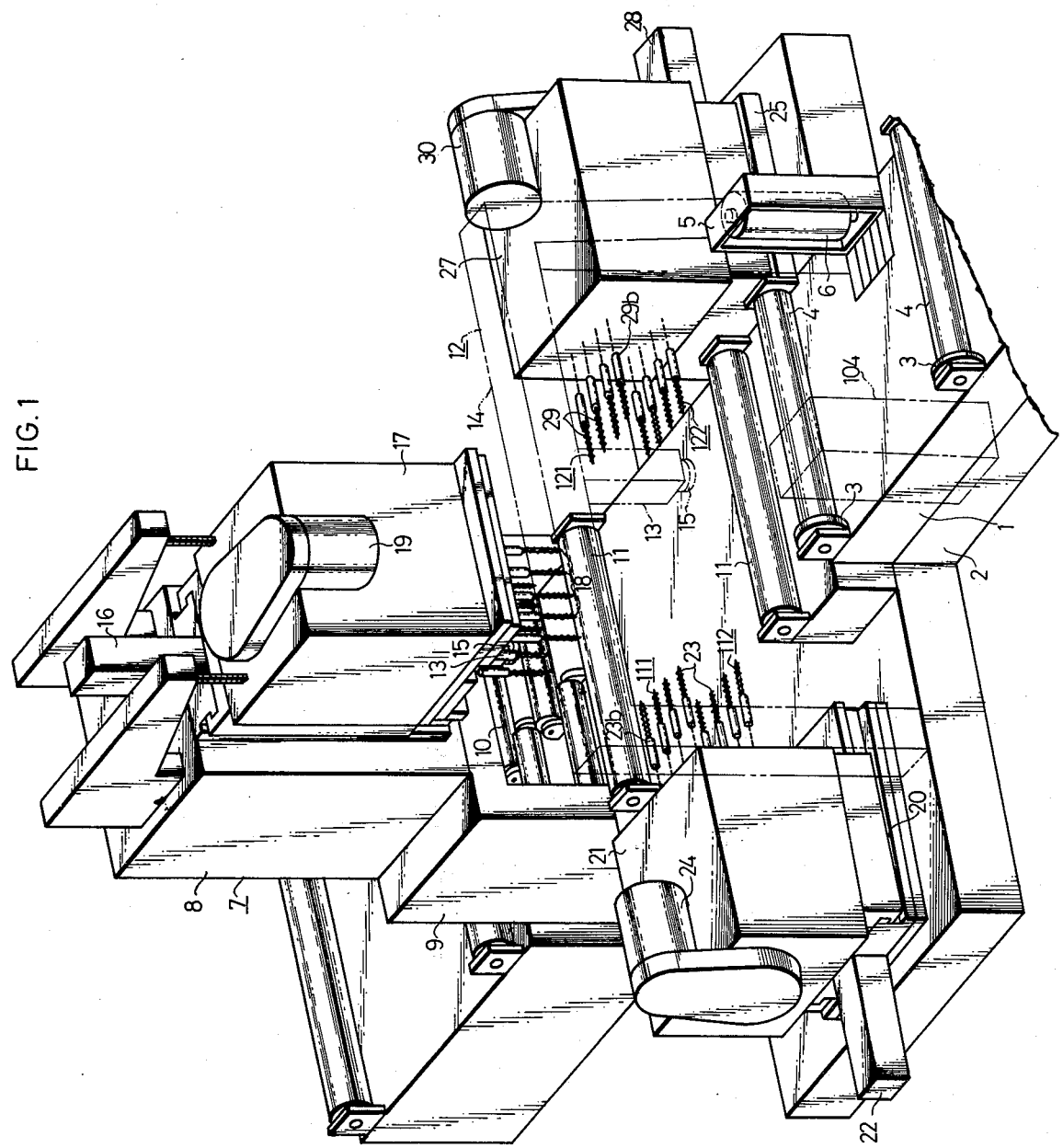
FIG. 1 is a partially cut-out perspective view showing a multiple spindle drilling machine for wide flange beams according to the present invention.
Figure 2:
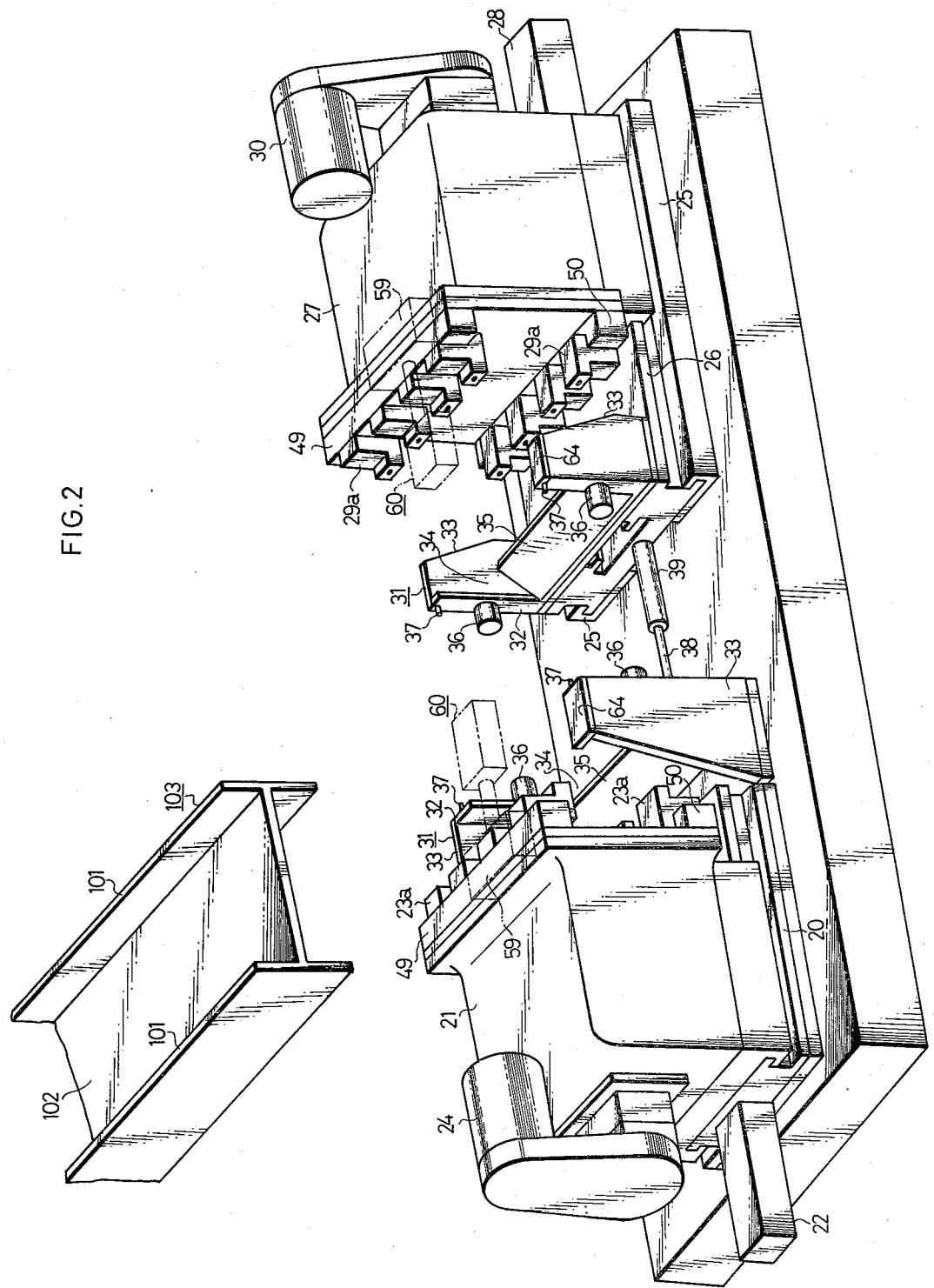
FIG. 2 is a partial perspective view showing the state of supporting a gear box on a bed in the drilling machine of the present invention shown in FIG. 1.

As shown in FIG. 2, a pair of gripping members 31 are vertically fixed on the top face of the bed 2 on the right side of the guide member 20 and on the top face of the left end of the slide member 26 so that they correspond to each other, and each gripping member 31 comprises a pair of front and rear slide plates 33 and a pair of attachment plates 32. A notch 34 is formed from the upper portion in each attachment plate 32. Rightward and leftward lowering plates 35 for lowering drilling dusts are disposed on the lower portions of the notches 34 of the attachment plates 32, respectively. A distance between the pair of the side plates 33 of each gripping member 31 is slightly larger than the width between the frontmost and rearmost drills 23 on the right side face of the left gear box 21 and the distance between the frontmost and rearmost drills 29 on the left side of the right gear box 27, and the positions of the top ends of the dripping plates 35 are slightly lower than the positions of the drills 23 and 29 in the lower rows.

As shown in FIGS. 2 and 3, cantilever supporting rollers 36 are freely rotatably mounted on the right side face and left side face of the attachment plates 32 located on both the front and rear sides of each notch 34, respectively, and the attachment positions of these supporting rollers 36 are on the same height as the above-mentioned delivery rollers 11 and supporting rollers 4 on the machine stand 1. A pressing projection 37 is disposed above each supporting roller 36 on the right or left side of the attachment plate 32 so that the vertical position thereof can be adjusted freely without any stage.

The base end of a screw lever 38 is rotatably supported on the bed 2 in the left gripping member 31 and the top end of the screw lever 38 is projected to the right and screwed into a nut 40 disposed in the interior of the slide member 26. This screw lever 38 is driven and rotated through a torque limiter by a motor 40a. Accordingly, when the screw lever 38 is rotated and screwed into the nut 40, the slide members 26 are moved to the left together with the gripping members 31 and supporting rollers 36 on the top faces of the slide members 26, and the wide flange beam 103 is fixed and gripped between both the left and right pressing projections 37. A protecting pipe 39 is capped on the screw portion of the screw lever 38 for protecting it from drilling dusts.

The operation of drilling the flanges 101 of the wide flange beam 103 by the multiple spindle drilling machine having the above structure will now be described.

The vertical positions of the pressing projections 37 of the respective gripping members 31 are adjusted according to the height of the flanges 101 of a wide flange beam 103, and the positions of the right supporting rollers 36 are adjusted in the left-right direction according to the width of the beam 103 (the length between both the flanges 101) so that a space slightly larger than the width of the beam 103 is formed. The adjustment of the positions of the supporting rollers 36 is accomplished by rotating the screw lever 38 and moving the slide member 26 to the left or right together with the right gripping member 31 along the guide rail 25. Then, the wide flange beam 103 is placed on the supporting rollers 4 and 36 and delivery rollers 11, and the screw lever 38 is turned and screwed into the nut 40 of the slide member 26, whereby the right supporting rollers 36 attached to the slide member 26 through the gripping members 31 are shifted to the left and the beam 103 is fixed and gripped between the pressing projections 37 in the space between both the gripping members 31.

At this point, also the right gear box 27 is moved to the left together with the slide member 26. When the right supporting rollers 36 are moved to the left, both the flanges 101 of the beam 103 is caused to slide on the supporting rollers 36.

Then, the hydraulic cylinders 22 and 28 attached to the guide member 20 and to the slide members 26 are operated while rotating drills 23 and 29, to move the left gear box 21 on the bed 2 to the right along the guide member 20 and move the right gear box 27 to the left along the slide member 26, whereby both the flanges 101 of the beam 103 are drilled by the drills 23 and 29.

Since the supporting rollers 36 corresponding to the drills 18, 23 and 29 are cantilever rollers, dusts formed on drilling are hardly accumulated on the rollers 36 but are left to fall on the bed 2, and therefore, discharge of drilling dusts can be facilitated. Further, since the supporting rollers 36, gripping member 31 and gear box 27 on the right side are moved integrally in the widthwise direction of the wide flange beam 103, when the wide flange beam 103 is placed on the supporting rollers 36 and gripped and fixed, it is unnecessary to move the supporting rollers 36, gripping member 31 and gear box 27 independently, and fixation of the wide flange beam 103 can be accomplished very easily and advantageously. Still further, since the supporting rollers 36 are supported by both the gripping members 31, moving means including screw levers 38 and nuts 40 can be used for both the supporting rollers 36 and the gripping members 31, and the moving strokes of the gripping members 31 to be moved after placing of the wide flange beam 103 on the supporting rollers 36 to grip the beam 103 and the moving strokes of the rows of drills can be diminished and the entire structure of the drilling machine can be made compact.

When other portions of the wide flange beam 103 are drilled, the beam 103 is shifted by the shifting device 104 and the above-mentioned operations are repeated.

Drilling of both the flanges 101 must be conducted in such a state that the flanges 101 are put into upper and lower parts symmetrically based on the web center of the wide flange beam 103. For this purpose, a centering device for determining the web center and a device for adjusting the vertical positions of the drills 23 and 29 are used in the present invention. These two devices will now be described by reference to FIGS. 3 to 9.

Figure 6:
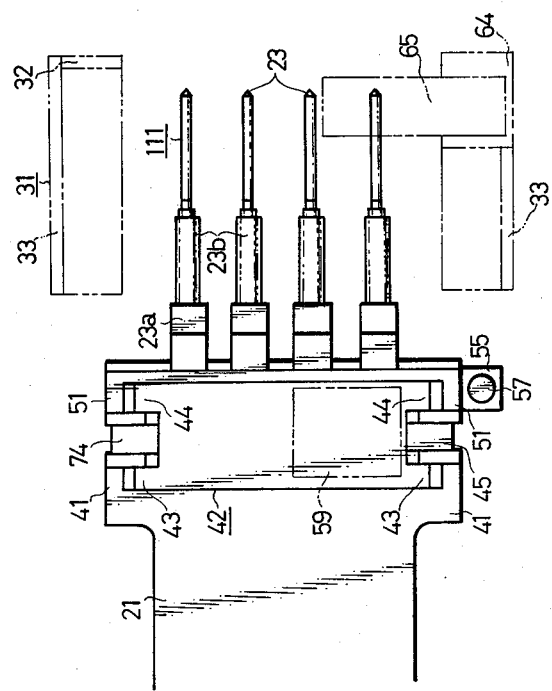

The structures of the vertical position adjustment device and centering device for the drills 23 and 29 on the left side are first described. As shown in FIG. 6, a dovetail portion 41 is formed on the right side of the left gear box 21 entirely along the vertical direction thereof, and front and rear parts of the dovetail portion 41 are paired and confront each other.

A hollow guide member 42 is mounted on the right side face of the left gear box 21, and a pair of guide projections 43 are formed on both the front and rear ends on the left side of the guide member 42 and are fitted in the front and rear parts of the dovetail portion 41 so that the projections 43 can slide in the vertical direction. A pair of guide projections 44 having the same shape as that of the guide projections 43 are formed on both the front and rear ends on the right side of the guide member 42.

As shown in FIG. 3, upper, intermediate and lower stoppers 45, 46 and 47 are fixed to the top end portion, central portion and lower end portion of the front side face of the guide member 42, respectively, between the guide projections 43 and 44. These stoppers are the same with respect to the shape and the vertical arrangement. Sleeve liners 105 are dismountably capped on the upper and lower ends of the intermediate stopper 46 and on the top end of the lower stopper 47. Both the sleeves 105 of the intermediate liner 46 are the same in the length.

Accordingly, all the stoppers 45 to 47 are arranged so that their vertical positions with respect to the left gear box 21 can be adjusted through the guide member 42.

Figure 5:
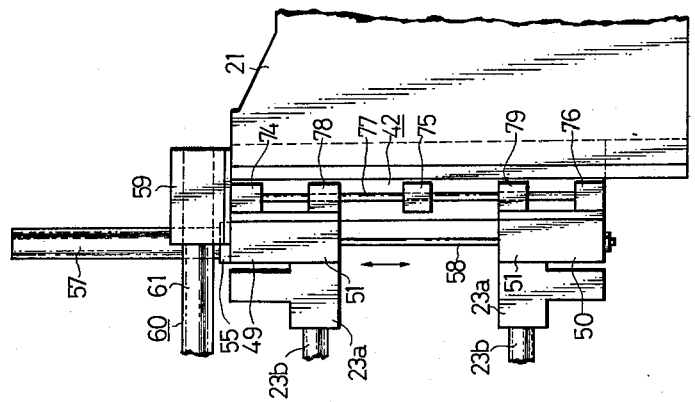
FIG. 5 is a partially cut-out back view of the main portion shown in FIG. 3.

As shown in FIG. 5, upper, intermediate and lower supporting pieces 74, 75 and 76 are fixed to the top end portion, central portion and lower end portion of the rear side face of the guide member 42, respectively, between the guide projections 43 and 44, and they correspond to the upper, intermediate and lower stoppers 45, 46 and 47, respectively, on the front side face of the guide member 42. A guide rod 77 is disposed in a line in the vertical direction among the supporting pieces 74, 75 and 76.

Accordingly, the guide rod 77 can be moved together with the guide member 42 in the vertical direction with respect to the left gear box 21.

Figure 7:
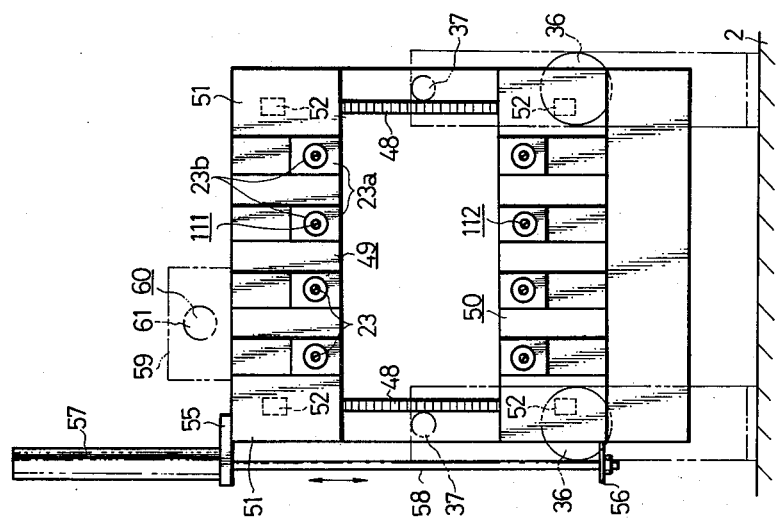
FIGS. 6 and 7 are partial plan and side views of the main portion shown in FIG. 3.

A pair of racks 48 are disposed on the front and rear part in the guide member 42 as shown in FIG. 7 and they are directed toward the drills 23. A pair of upper and lower movable members 49 and 50 are attached to the right side face of the guide member 42, and as shown in FIG. 6, a pair of slide members 51 disposed on both the front and rear ends of each of the movable members 49 and 50 are vertically movably fitted on the guide projections 44 on the right side of the guide member 42. Further, a pair of pinion gears 52 are disposed in each of the upper and lower movable members 49 and 50 so that they can be engaged with the racks 48. By this arrangement, when the respective movable members 49 and 50 are vertically moved, their vertical movements are made synchronous with each other at both the front and rear ends thereof.

The holding members 23a for fixing the drills 23 are attached to the right side face of each of the upper and lower movable members 49 and 50 so that the front-rear positions of the holding members 23a can be adjusted.

As shown in FIG. 3, an upper movable stopper 53 is projected on the left side of the lower end of the slide member 51 on the front portion of the upper movable member 49 to correspond to the upper and intermediate stopper 45 and 46 of the guide member 42. A lower movable stopper 54 similar to the upper movable stopper 53 is projected on the left side of the upper end of the slide member 51 on the front portion of the lower movable member 50 to correspond to the intermediate and lower stoppers 46 and 47 of the guide member 42.

Each of the upper and lower movable stoppers 53 and 54 has the same shape as that of the foregoing three stoppers 45 to 47. A sleeve liner 105 having the same length as that of the sleeve liner 105 of the lower stopper 47 is dismountable attached to the upper end of the upper movable stopper 53. The upper movable stopper 53 is located in the midway between the upper stopper 45 and intermediate stopper 46 of the guide member 42, and the lower movable stopper 54 is located in the midway between the intermediate stopper 46 and lower stopper 47 of the guide member 42. The distance between the lower end of the upper movable stopper 53 and the upper end of the intermediate stopper 46 is made equal to the distance between the upper end of the lower movable stopper 54 and the lower end of the intermediate stopper 46.

Accordingly, the central position 131 of the intermediate stopper 46 with respect to the vertical direction coincides with the center between both the upper and lower rows 111 and 112 of the drills.

As shown in FIG. 5, an upper slide piece 78 is projected on the left side of the lower end of the slide member 51 on the rear portion of the upper movable member 49 and the guide rod 77 is fitted and inserted in the upper slide piece 78 between the upper and intermediate supporting pieces 74 and 75 of the guide member 42 so that the guide rod 77 can be vertically slid. A lower slide piece 79 similar to the upper slide piece 78 is projected on the left side of the top end of the slide member 51 on the rear portion of the lower movable member 50 and the guide rod 77 is fitted and inserted in the lower slide piece 79 between the intermediate and lower supporting pieces 75 and 76 of the guide member 42 so that the guide rod 77 can be vertically slid.

Accordingly, when the upper and lower movable members 49 and 50 are vertically moved along the guide member 42, also the upper and lower slide pieces 78 and 79 are simultaneously moved integrally in the vertical direction while being guided by the guide rod 77.

As shown in FIGS. 3 and 7, corresponding brackets 55 and 56 are projected forwardly on the upper end of the upper movable member 49 and the lower end of the lower movable member 50, respectively. A hydraulic cylinder 57 is vertically disposed on the bracket 55 of the upper movable member 49 and the lower end of a rod 58 of the hydraulic cylinder 57 is fixed to the other bracket 56. Accordingly, when the rod 58 of the hydraulic cylinder 57 is contracted, both the movable members 49 and 50 are brought close to each other along the guide member 52, and when the rod 58 of the hydraulic cylinder 57 is elongated, both the movable members 49 and 50 are separated from each other.

As especially shown in FIGS. 6 and 7, a supporting stand 59 is fixed to the top face of the front portion of the guide member 42 and a connecting member 60 is supported by this supporting stand 59. As shown in FIGS. 3 and 8, this connecting member 60 extends in the left-right direction, and it comprises a columnar connecting portion 61 located in the left half, an angular slide portion 62 contiguous to the columnar connecting portion 61 on the right side thereof, and a plate-like supporting portion 63. The connecting portion 61 is inserted into the interior of the supporting stand 59 so that it can be moved in the left-right direction.

The slide portion 62 of the connecting member 60 is located above between the drill 23 located on the front end and the subsequent drill 23, and with respect to the left-right direction, the slide portion 62 corresponds to the top end of the side plate 33 of the left gripping member 31. The right end of the supporting portion 63 of the connecting member 60 is located slightly rightwardly of the left gripping member 31.

As shown in FIGS. 8 and 9, a base plate 64 is attached onto the side plate 33 and attachment plate 32 located on the front side of the left gripping member 31, and a fixed stand 65 is vertically disposed on the base plate 64 so that the top end of the fixed stand 65 is extended backwardly. The slide portion 62 of the connecting member 60 is vertically movably supported by a supporting portion 66 on the top end of the fixed stand 65.

As shown in FIGS. 3 and 9, a hydraulic cylinder 67 is vertically disposed on the top face of the supporting portion 66 of the fixed stand 65, and the lower end of a rod 68 of the cylinder 67 is fixed to the slide portion 62 of the connecting member 60. Accordingly, when the rod 68 of the hydraulic cylinder 67 is vertically moved, the connecting member 60 and the guide member 42 through the supporting stand 59 are vertically moved.

As shown in FIG. 3, a sensing rod 69 is attached to the lower face of the right end of the supporting portion 63 of the connecting member 60 so that the vertical position of the sensing rod 69 can be slightly adjusted by a holder 70. A contact member 71 is fixed to the lower end of the sensing rod 69. The position of the contact member 71 is set so that the position of the lower face of the contact member 71 is higher by ½ of the thickness of a web 102 of a wide flange beam 103 to be drilled than the central position of the intermediate stopper 46 of the guide member 42 with respect to the vertical direction, namely the position of the central line between the upper and lower drill rows 111 and 112. As shown in FIG. 3, the contact member 71 of the sensing rod 69 bears against the top face of the web 102 at a position near the left flange 101 of the beam 103, and the contact member 71 has a function also as a pressing member for pressing and fixing the beam 103 to the supporting rollers 36 and the like at the drilling operation.

An indicator 72 is attached to the upper portion of the sensing rod 69 so that it is projected to the left and it can be vertically moved integrally with the sensing rod 69. A gauge 73 is vertically movably attached to the lower face of the supporting portion 63 of the connecting member 60 in the left of the sensing rod 69, and the vertical position of the sensing rod 69 can be read from the indicator 72.

Another centering device and vertical drill position adjustment device having the same structures as the above-mentioned structures are disposed on the left side face of the right gear box 27 and the right gripping member 31 as shown in FIG. 3 symmetrically with the above-mentioned centering and adjustment devices.

The operations of setting the web center of a wide flange beam 103 by using the above-mentioned centering and adjustment devices and drilling flanges 101 of the beam 103 at appropriate positions will now be described.

In the state where a pair of the sensing rods 69 are upwardly shifted together with the connecting members 60, the guide members 42 and the like so that the contact members 71 on the lower ends of the sensing rods 69 are separated from the upper face of the web 102 of the wide flange beam 103, the lower faces of the left and right contact members 71 are set at positions higher by ½ of the thickness of the web 102 of the beam 103 than the central positions 131 of the intermediate stoppers 46 of the guide members 42 co-operatively interconnected with said contact members 71 with respect to the vertical direction. The operation of this position adjustment can be accomplished by reading the position of the indicator 72 on the upper portion of each sensing rod 69 from the gauge 73.

When the lower face position of each contact member 71 is thus determined, the central positions 131 of the left and right intermediate stoppers 46 come to coincide with the central line between the upper and lower drill rows 111 and 112 and the central line between the upper and lower drill rows 121 and 122, respectively. As a result, the lower faces of the respective contact members 71 are located at the positions higher by ½ of the thickness of the web 102 of the beam 103 than the central line positions between the drill rows 111 and 112 and between the drill rows 121 and 122.

Then, the hydraulic cylinders 67 on a pair of the gripping members 31 are operated to bring down the rods 68 thereof, whereby a pair of the connecting members 60 having the slide portions 62 thereof fixed to the rods 68 are brought down along the supporting portions 66 of the fixed stands 65. Simultaneously, the sensing rods 69 attached to the supporting portions 63 of the connecting members 60 are brought down, and the guide members 42 attached to the connecting portions 61 of the connecting members 60 through the supporting stands 59 are integrally moved downwardly along the dovetail portions 41 of the left and right gear boxes 21 and 27. Accordingly, the stoppers 45 to 47, hydraulic cylinders 57, movable members 49 and 50 and drill rows 111, 112, 121 and 122 attached to the guide members 42 are simultaneously moved downwardly integrally with the guide members 42.

When the sensing rods 69 are moved downwardly, the contact members 71 on the lower ends thereof bear against the top face of the web 102 of the wide flange beam 103, and at this point, the operations of the hydraulic cylinders 67 are stopped. In this state, the web center of the beam 103 is located on the central line between the upper drill rows 111 and 121 and the lower drill rows 112 and 122. Namely, the lower faces of the contact members 71 of the sensing rods 69 are set at positions higher by ½ of the thickness of the web 102 of the beam 103 than the position of said central line between the upper drill rows 111 and 121 and the lower drill rows 112 and 122. Accordingly, when the contact members 71 bear against the upper face of the web 102, the central line between the upper drill rows 111 and 121 and the lower drill rows 112 and 122 is at a position lower by ½ of the thickness of the web 102 than the position of the upper face of the web 102, namely at the same position as that of the web center.

When the operation of centering the web 102 of the wide flange beam 103 has thus been completed, the hydraulic cylinders 57 attached to the guide members 42 are operated to move the rods 58 thereof upwardly or downwardly.

When the rods 58 are moved upwardly, as shown in FIGS. 10-(a) and 10-(b), the lower movable members 50 attached to the lower ends of the rods 58 are first moved upwardly along the guide members 42, and then, the lower movable stoppers 54 of the lower movable members 50 bear against the intermediate stoppers 46 of the guide members 42. At this point, the cylinders 57 per se are moved downwardly, and hence, the upper movable members 49 attached to the cylinders 57 begin the downward movement. When the upper movable stoppers 53 of the upper movable members 49 bear against the intermediate stoppers 46 of the guide members 42, both the movable members 49 and 50 are stopped.

In this state, when the rods 58 are moved downwardly, the lower movable members 50 attached to the lower ends of the rods 58 are first moved downwardly and the lower movable stoppers 54 of the movable members 50 bear against the lower stoppers 47 of the guide members 42. At this point, the hydraulic cylinders 57 are moved upwardly and the upper movable members 49 begin the upward movement together with the cylinders 57. When the upper movable stoppers 53 of the upper movable members 49 bear against the upper stoppers 45 of the guide members 42, both the movable members 49 and 50 are stopped (see FIG. 3).

When both the upper and lower movable members 49 and 50 are moved upwardly or downwardly, the slide pieces 78 and 79 on the rear portions thereof are vertically moved along the guide rod 77 [see FIG. 10-(b)] and pairs of the pinion gears 52 built in the movable members 49 and 50 are engaged with a pair of the racks 48 mounted on the guide member 42 and rotated integrally therewith. Accordingly, both the movable members 49 and 50 are moved so that the movements of both the front and rear ends of both the movable members 49 and 50 are synchronous with each other and ends of one movable member are not inclined downwardly or upwardly.

When both the upper and lower movable members 49 and 50 are vertically moved in the above-mentioned manner, the drills of the upper rows 111 and 121 and the lower rows 112 and 122 are moved in a direction coming close to each other or separating from each other, and when the vertical movement of the movable members 49 and 50 is completed, these drills of the upper rows 111 and 121 and the lower rows 112 and 122 are located symmetrically with each other with the web center of the wide flange beam 103 being as the center of the symmetry.

When both the upper and lower drill rows are brought close to each other, the space between the upper and lower drill rows is adjusted by adjusting the length of the two sleeve liners 105 attached to the intermediate stopper 46 of the guide member 42, and when they are spaced from each other, the distance between the upper and lower drill rows is adjusted by adjusting the length of the sleeve liner 105 attached to the upper movable stopper 53 of the upper movable member 49 and the length of the sleeve liner 105 attached to the lower stopper 47 of the guide member 42.

Figure 11:
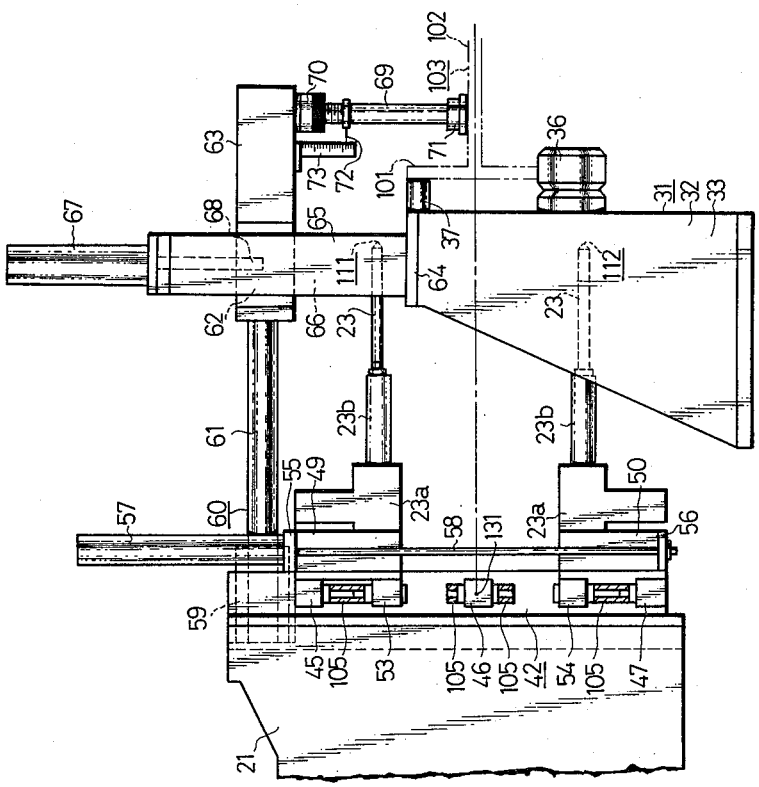
FIG. 11 is a partial front view illustrating the state of drilling a wide flange beam.
Figure 12:
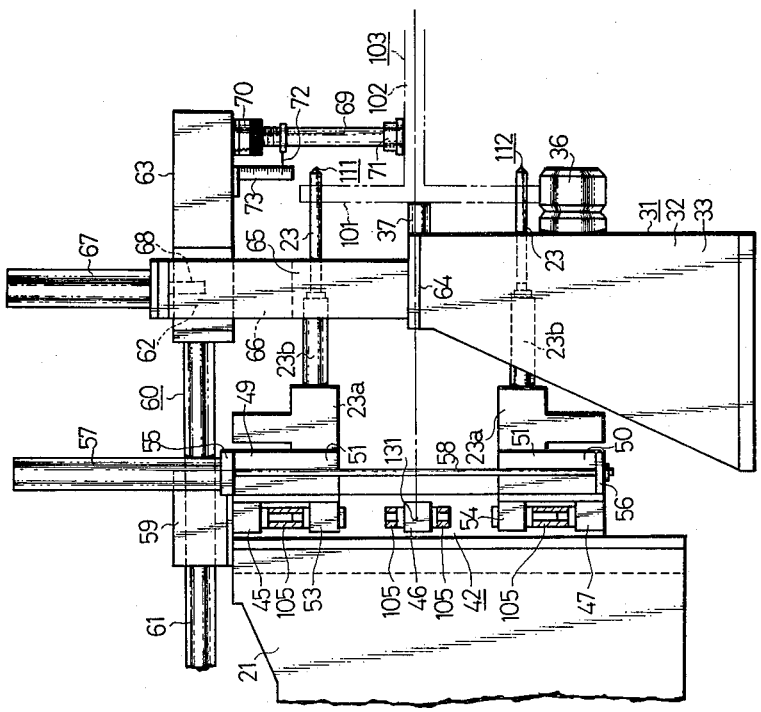
FIG. 12 is a partial front view illustrating the state of centering a wide flange beam having a low height.

When the drills of both the upper and lower rows are thus moved symmetrically with respect to the web center of the wide flange beam 103 and their positions are set, both the left and right gear boxes 21 and 27 are advanced, as shown in FIG. 11, so that they are brought close to each other, whereby the drills of the upper rows 111 and 121 and the lower rows 112 and 122 on both the left and right sides make drilling processing on both the left and right flanges 101 of the beam 103. In this case, the drilling positions are symmetrical with respect to the vertical direction with the web center of the beam 103 being as the center of symmetry.

When both the left and right gear boxes 21 and 27 are shifted, the supporting stands 59, the hydraulic cylinders 57 and other members on the top faces of the gear boxes 21 and 27 are simultaneously moved through the guide members 42, but the connecting members 60 are not moved in the left-right direction because the connecting portions 61 thereof slide in the supporting stands 59 and project to the left or right.

When a pair of the centering device and vertical drill position adjustment device are disposed on each of the left and right sides of the wide flange beam 103 as in the foregoing embodiment, the foregoing devices can be separately operated on each side. Accordingly, even if the web 102 of the wide flange beam 103 is not horizontal with respect to the left-right direction as shown in FIG. 13, the central positions of the web 102 on both the left and right ends thereof can easily be found out by the paired centering and vertical drill position adjustment devices on the left side and those on the right side, respectively, and therefore, the drilling operation can be performed very easily. Further, when each sensing rod 69 is located on the side near the flange 101 above the web 102 of the beam 103 as in the foregoing embodiment, the position of the web center on either left or right side face of the flange 101 can be determined more precisely.

In the foregoing embodiment, when the position of the lower face of the contact member 71 of the sensing rod 69, the position of the indicator 72 in the upper portion of the sensing rod 69 is read from the gauge 73. Alternately, a liner having a length corresponding to ½ of the thickness of the web 102 of the wide flange beam 103 to be drilled may be fitted to the lower end of the sensing rod 69 to set the position of the lower face of the contact member 71.

Further, the three stoppers 45 to 47 attached to the guide member 42 may be arranged so that their vertical positions can be adjusted with respect to the guide member 42.

Still further, in the foregoing embodiment, only the right gripping member 31 and gear box 27 are arranged so that they can be moved to the left and right. Alternately, the left gripping member 31 and gear box 21 may be movably arranged, or the supporting rollers 36 may be attached through members other than the gripping members 31. As means for moving the slide member 26, there may be used a cylinder device instead of the screw lever 38 and nut 40, and the motor and torque limitter for rotating the screw lever 38 may be changed to a torque motor.

Figures 14, 15:
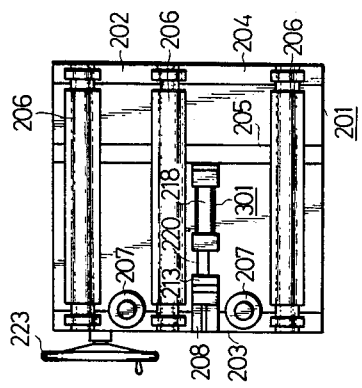
FIG. 14 is a side view of a delivery device including an auxiliary clamp mechanism.
FIG. 15 is a plan view of the delivery device of FIG. 14.

In the foregoing embodiment, a plurality of supporting rollers 4 and the moving device 104 on the machine stand 1 are utilized for feeding a wide flange beam 103 to the drilling operation zone of the multiple spindle drilling machine for wide flange beams. As such feed means, there can also be employed a delivery device as shown in FIGS. 14 and 15. This delivery device will now be described.

As shown in FIGS. 14 and 15, a delivery device 201 is disposed adjacently to the front side of the body portion of the drilling machine, so that a wide flange beam 103 is shifted onto the body portion of the drilling machine. The left and right positions of the delivery device 201 correspond to the positions of the above-mentioned supporting rollers 36.

Figure 16:
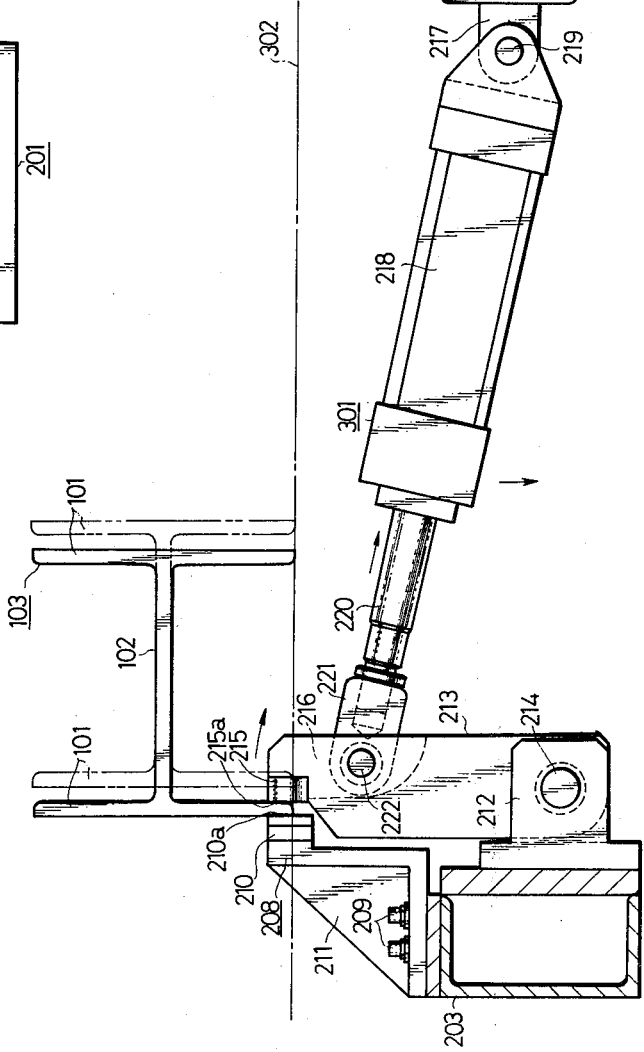
FIG. 16 is an enlarged view illustrating the auxiliary clamp mechanism in the clamping state together with a wide flange beam.

A frame 202 of the delivery device 201 includes on the top face thereof left and right supporting frame portions 203 and 204 on both the sides thereof as shown in FIGS. 15 and 16. Further, an intermediate supporting frame portion 205 is formed at a position slightly deviated rightwards from the center between both the supporting frame portions 203 and 204. These supporting frame portions 203, 204 and 205 have the same height, and the intermediate and right supporting frame portions 205 and 204 have such a channel-shaped section that open parts thereof confront each other.

A plurality of driving rollers 206 are horizontally disposed on the frame 202 to span between both the left and right frame portions 203 and 204, and each of the rollers 206 has the same height as that of the supporting rollers 36 of the body portion of the drilling machine and the rollers 206 are arranged so that the rotating direction can be changed over from the normal direction to the reverse direction or vice versa or they can freely rotate. Guide rollers 207 are vertically disposed on the left supporting frame portion 203 of the frame 202 between every two adjacent driving rollers 206, respectively, and they are arranged in one line along the front-rear direction so that they can freely rotate. The rollers 207 bear against the left flange of the wide flange beam 103 to guide the beam 103 backwards. The bearing portion of each roller 207 is located on the same plane as that of the bearing face of the pressing projection 37 of the above-mentioned fixed gripping member 31.

An auxiliary clamp mechanism 301 is laterally disposed in the upper portion of the frame 202 of the delivery device 201 between one driving roller 206 and the corresponding guide roller 207 so that when the wide flange beam 103 is clamped sidewards by the main clamp mechanism comprising a pair of gripping members 31 on the body portion of the drilling machine, the auxiliary clamp mechanism 301 co-operates with this main clamp mechanism to clamp the lower end of the left flange 101 of the beam 103.

Figure 17:
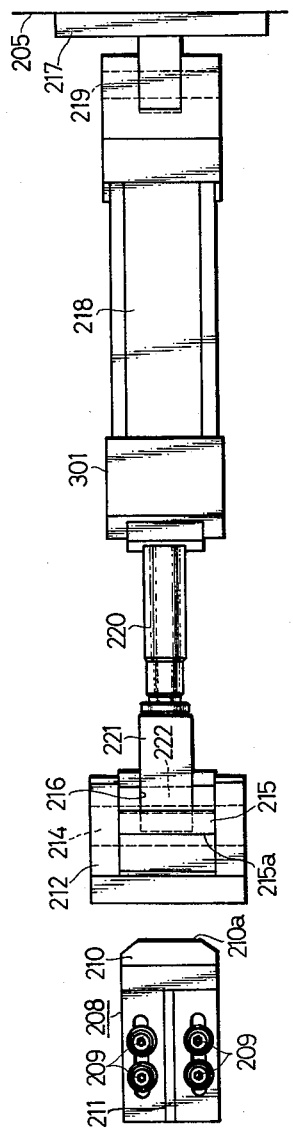
FIG. 17 is an enlarged exploded plan view showing a part of the clamp mechanism.

This auxiliary clamp mechanism 301 will now be described by reference to FIGS. 16 and 17. A fixed gripping piece 208 is vertically disposed on the top face of the left supporting frame portion 203 of the frame 202 and it has an L-shaped front face, and the gripping piece 208 is fixed to the supporting frame portion 203 by a plurality of bolts 209 so that the position of the gripping piece 208 can be adjusted with respect to the left-right direction. A backing plate 210 is fixed to the top end of the right side portion of the fixed gripping piece 208, and as in case of the above-mentioned guide roller 207, the clamping face 210a of the backing plate 210 is located on the same plane as that of the clamping face of the pressing projection 37 of the fixed gripping member 31. Further, the upper half of the backing plate 210 projects upwardly beyond the top end position of the driving roller 206 as shown in FIG. 16.

Incidentally, reference numeral 211 represents a reinforcing rib disposed outside the fixed gripping piece 208.

A supporting member 212 is fixed to the right side of the left supporting frame portion 203, and the lower end of a long movable gripping piece 213 is pivoted on a shaft 214 so that it can be inclined to the left or right with respect to the supporting member 212. A backing plate 215 similar to the backing plate 210 fixed to the fixed gripping piece 208 is fixed to the top end of the movable gripping piece 213 at a position corresponding to the position of the backing plate 210. Accordingly, also the upper half of this backing plate 215 projects upwardly from the top end position 302 of the driving roller 206. A concave groove 216 is formed on the upper portion of the movable gripping piece 213 so that it is opened to the upper portion and right side of the movable gripping piece 213.

A supporting member 217 is fixed on the left side face of the intermediate supporting frame portion 205 of the frame 202 at a position confronting the supporting member 212 of the left supporting frame portion 203, and the right end of a hydraulic cylinder 218 is pivoted on a shaft 219 so that it can be inclined with respect to the supporting member 217. A connecting piece 221 is screwed to the top end of a rod 220 of the hydraulic cylinder 218, and the connecting piece 221 is inserted into the substantially central portion of the concave groove 216 of the movable gripping piece 213 and is pivoted on a shaft 222 so that it can be inclined with respect to the gripping piece 213.

The device for operating the movable gripping piece 213 is thus constructed by the foregoing supporting member 217, hydraulic cylinder 218, connecting piece 221, etc., and this operating device is always located below the top end position 302 of the driving roller 206.

A feed handle 223 is attached on the left side of the frame 202 of the delivery device 201 so that when the driving rollers 206 of the delivery device 201 are arranged in the freely rotatable state, the rollers 206 are simultaneously rotated in the normal or reverse direction manually through the handle 223.

The operation of feeding a wide flange beam 103 to the body portion of the drilling machine by using the delivery device 201 having the above-mentioned structure will now be described.

The top end of a wide flange beam 103 is placed on the driving rollers 206 of the delivery device 201 from the front part of the body portion of the drilling machine and the driving rollers 206 are driven in the normal direction. At this point, the outer side face of the left flange 101 of the beam 103 is caused to bear against the guide rollers 207.

When the driving rollers 206 are rotated in the normal direction, the beam 103 on the rollers 206 are fed backwards while being guided by the guide rollers 207, and it is supported by the driving rollers 206 and the supporting rollers 36 attached to both the left and right gripping members 31 at positions corresponding to those of both the left and right gear boxes 21 and 27 and the vertical gear box 17.

Figure 18:
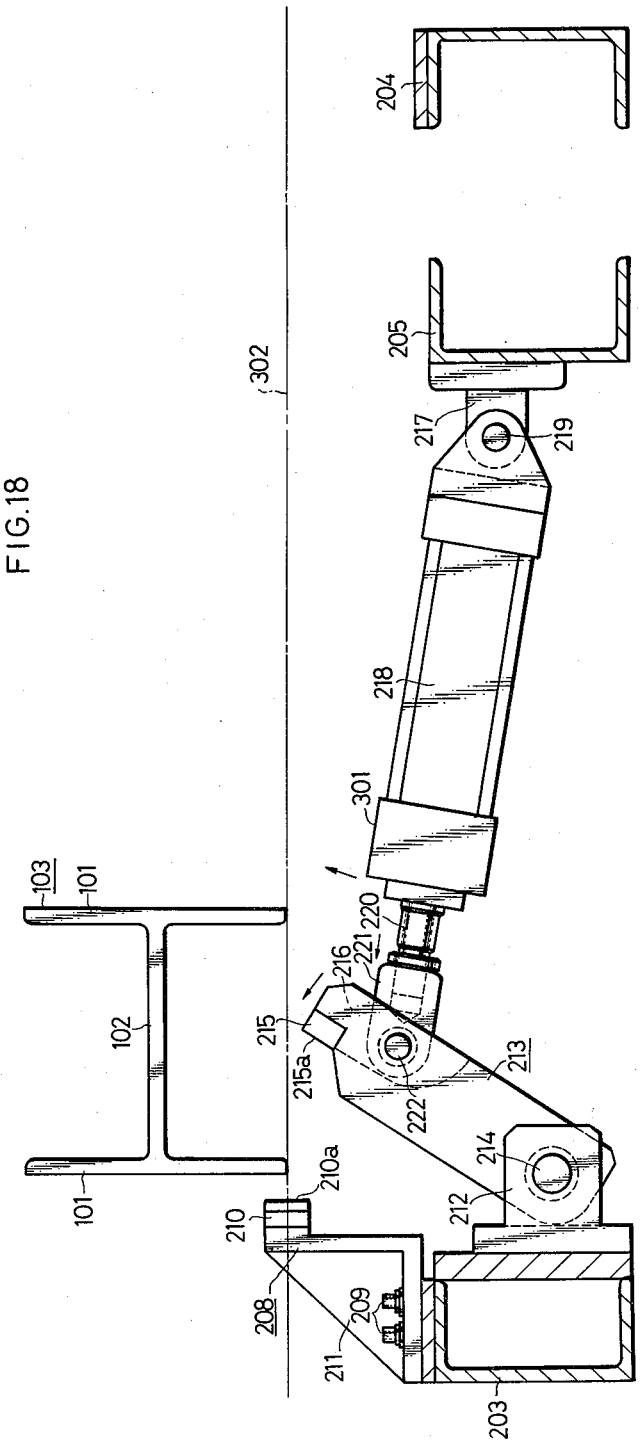
FIG. 18 is an enlarged front view showing the auxiliary clamp mechanism in the non-clamping state together with a wide flange beam.

When the above-mentioned auxiliary clamp mechanism 301 is used in this delivery device, prior to placing the wide flange beam 103 on the delivery device 201, the spacing between the backing plate 215 of the movable gripping piece 213 and the backing plate 210 of the fixed gripping piece 208 is broadly expanded, as shown in FIG. 18.

This expansion of the spacing between the backing plates 215 and 210 is accomplished by retreating the rod 220 of the hydraulic cylinder 218. More specifically, when the rod 220 is retreated, the movable gripping piece 213 is inclined to the right through the connecting piece 221 mounted on the top end of the rod 220, and therefore, the spacing between both the backing plates 215 and 210 is opened and expanded. When the movable gripping piece 213 is inclined, the hydraulic cylinder 218 is inclined downwards with the pivoting portion 219 on the supporting member 217 being as the center, and the top end of the movable gripping piece 213 is located below the top end position of the driving roller 206.

While the spacing between both the backing plates 210 and 215 is thus expanded, the wide flange beam 103 is placed on the delivery device 201 and is delivered backwards in the above-mentioned manner.

When the above-mentioned delivery operation of the wide flange beam 103 is completed, the beam 103 is gripped between both the gripping members 31 on the body portion of the drilling machine, and simultaneously, the movable gripping piece of the auxiliary clamp mechanism 301 is raised and turned to the left. This turning operation is accomplished by projecting the rod 220 of the hydraulic cylinder 218.

Figure 19:
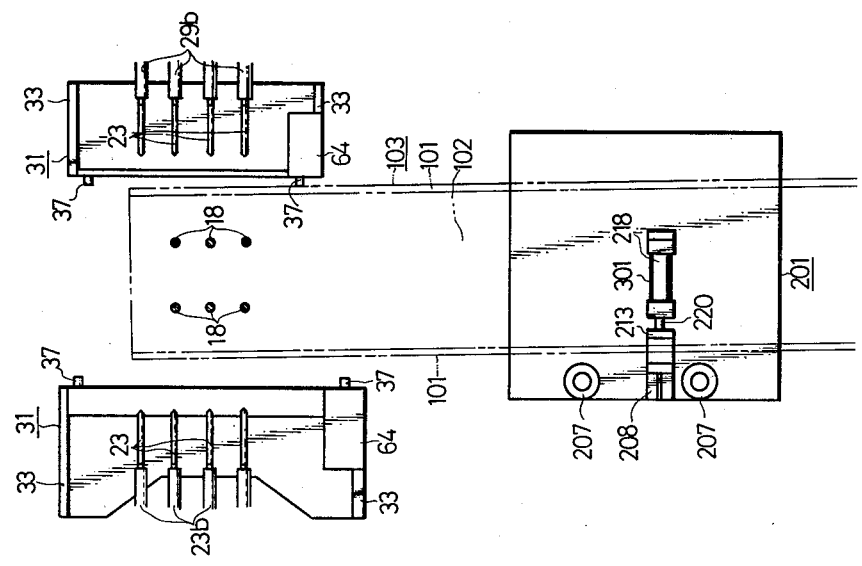
FIG. 19 is a partial plan view illustrating the state where a wide flange beam is fed obliquely between both the left and right gripping members.

When the movable gripping piece 213 is raised, if the beam 103 is apart rightwards from the clamping face 210a of the fixed gripping piece 208 and the guide rollers 207 of the delivery device 201, as shown in FIGS. 18 and 19, the clamping face 215a of the backing plate 215 is caused to bear against the inside of the left flange 101 of the beam 103 to press the flange 101 leftwards.

When the left flange 101 is thus pressed, the wide flange beam 103 is shifted to the left on the driving rollers 206 to adjust the position thereof as shown in FIG. 16, and the beam 103 is clamped between the backing plate 210 of the fixed gripping piece 208 and the backing plate 215 of the movable gripping piece 213. While the beam 103 is gripped between the backing plates 210 and 215, the left flange 101 of the beam 103 is located on the same plane as of the contact portion of the clamping face 210a of the backing plate 210 with the guide rollers 207 and of the clamping face of the pressing projection of the fixed gripping member 31. Accordingly, the left flange 101 is allowed to bear precisely also against the guide rollers 27 and the pressing projection 37. As a result, the wide flange beam 103 is kept straight and is prevented from being inclined with respect to the drills 18, 23 and 29.

When the adjustment of the position of the wide beam flange 103 is thus completed, the beam 103 is completely fixed and the drilling operation is then performed.

If the above-mentioned delivery device 201 is disposed at the rear part of the body portion of the drilling machine, it can be used as a device for discharging the wide flange beam 103.

If, as in the foregoing embodiment, the movable gripping piece 213 of the auxiliary clamp mechanism 301 is located below the top end position 302 of the driving roller 206 in the non-clamping state and the operation device for the movable gripping piece 213 is always located below the top end position 302 of the driving roller 206, even a landslide protection wide flange beam having end plates fixed to both the ends of a wide flange beam with respect to the longitudinal direction thereof can be similarly delivered and the position thereof can be similarly adjusted since the end plates do not interfere with the movable gripping piece 213 or the operating device therefor while the landslide protection wide flange beam is being delivered.

Figure 20:
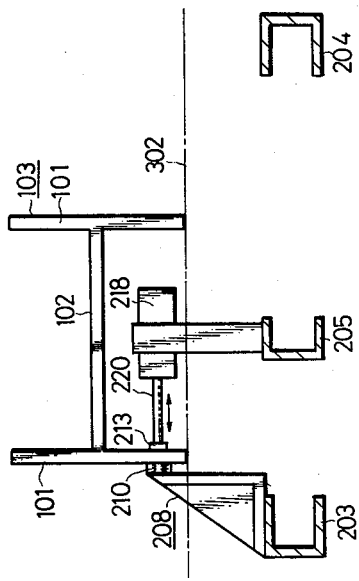
FIG. 20 is a front view illustrating another instance of the clamp mechanism.

Another instance of the auxiliary clamp mechanism 301 will now be described by reference to FIG. 20. The auxiliary clamp mechanism of this embodiment is different from the auxiliary clamp mechanism of the foregoing embodiment only in the point that the hydraulic cylinder 218 is fixed so that the entire of the hydraulic cylinder 218 is projected above the top end position 302 of the driving roller 206 and the movable gripping piece 213 is directly fixed to the top end of the rod 220 of the cylinder 218.

In this embodiment, therefore, the connecting piece 221 for connecting the movable gripping piece 213 to the rod 220 of the hydraulic cylinder 218 or the supporting member 212 for supporting the movable gripping piece 213 need not be disposed, and the entire structure of the mechanism can be simplified.

In this embodiment, only the hydraulic cylinder 218 acts as the operating device.

Figure 21:
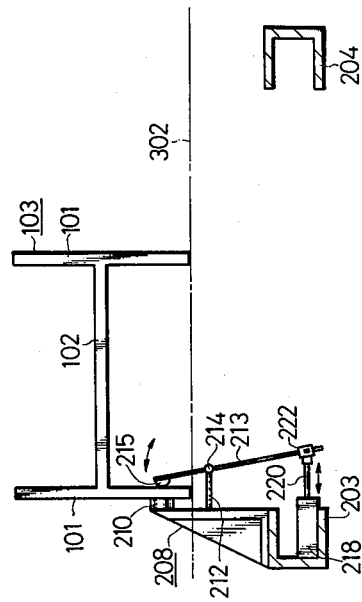
FIG. 21 is a front view illustrating still another instance of the clamp mechanism.

Another modification of the auxiliary clamp mechanism will now be described by reference to FIG. 21. In this embodiment, the movable gripping piece 213 is longitudinally disposed on the right side of the fixed gripping piece 208 as in the first embodiment, and the movable gripping piece 213 is pivoted on the shaft 214 by the fixed gripping piece 208 through the supporting member 212 at a point of ⅓ of the entire length of the movable gripping piece 213 from the top end thereof so that the movable gripping piece 213 can be inclined. Further, the hydraulic cylinder 218 is fixed to face rightwards with respect to the right side of the left supporting frame portion 203, and is pivoted on the shaft 222 so that the top end of the rod 220 can be turned with respect to the lower end of the movable gripping piece 213 and the vertical movement of the movable gripping piece 213 is allowed.

In this embodiment, on the movable gripping piece 213, the length between the shafts 214 and 222 is 2 times the length between the shaft 214 and the backing plate 215, and therefore, the force given to the lower end by the rod 220 of the hydraulic cylinder 218 is doubled and the doubled force is transmitted to the backing plate 215. Accordingly, the entire structure is arranged so as to constitute a toggle joint mechanism.

The above-mentioned auxiliary clamp mechanism 301 may be disposed on the body portion of the drilling machine, or it may be disposed so as to grip the right flange 101 of the wide flange beam 103.

The hydraulic cylinder 218 of the auxiliary clamp mechanism 301 may be replaced by a combination of a torque motor and a screw lever or a combination of an ordinary motor, a torque clutch and a screw lever.

The present invention has been described in detail by reference to the most preferred embodiments, but as will be apparent to those skilled in the art, various changes and modifications can be made without departing from the spirit and scope of the invention as defined in the appended claims, and the present invention is not limited by specific embodiments except those specified in the appended claims.

What is claimed is:

1. A multiple spindle drilling machine for wide flange beams, said beams having an elongated flat central portion (102) with peripheral edges and wide flanges (101) at right angles to said central portion (102) and extending above and below said edges so that the cross-sectional configuration of said beam is H-shaped, said machine comprising in combination:
   (a) a defined travel path with input and output ends including a lower bed (2) and an upper work station;
   (b) at least one pair of spaced apart gripping members (31) mounted over said bed on both sides of said travel path with horizontal plates (32) thereon;
   (c) at least one pair of flange support rollers (36) with at least one of said rollers (36) being attached to said gripping members (31), said rollers being disposed towards said lower bed (2) so as to receive said beam flanges (101) thereon;
   (d) guide means (20) mounted on said bed including rails (25) for movement normal to and along said travel path between said input and output ends, gear box means (21) mounted on said rails supporting drills (23) so that said drills (23) can move in the longitudinal and withwide direction of said beam for drilling said beam; and
   (e) moving means for moving at least one of said beam support rollers (36), said gripping members (31) and said gear boxes (21) integrally in the widthwise direction of the beam, said moving means including a sliding member disposed on the bed of the machine, said sliding member supporting said gear box and gripping member, and a screw lever (38) stretched across said bed (2) coupling said gripping members so as to move said gripping members with respect to each other, said screw lever (38) being rotatably inserted into said sliding member, and, motor means for driving and rotating said screw lever.

2. A machine as claimed in claim 1, said gripping member having a defined inner side for gripping said beam and an outer side, said gear box being attached to said sliding member on said outer side so that said gear box can move in the widthwise direction of the beam.

3. A machine as claimed in claim 1 including a delivery device on said input end including a frame, a plurality of drive rollers, rotatably mounted on the frame so as to place the beam thereon, and at least one vertical guide roller (6) mounted on the frame to control and adjust the widthwise position of the beam on the drive rollers.

4. A machine as claimed in claim 3 including an auxiliary clamp mechanism on said delivery device for adjusting and controlling the widthwise position of the beam fed onto the bed of the drilling machine at the drilling station.

5. A multiple spindle drilling machine for wide flange beams as set forth in claim 4 wherein said auxiliary clamp mechanism comprises a fixed gripping piece vertically mounted on a part of the delivery device, a movable gripping piece for gripping the lower portion of one flange of the wide flange beam between the movable gripping piece and the fixed gripping piece and an operating device for pressing the movable gripping piece toward the fixed gripping piece.

6. A multiple spindle drilling machine for wide flange beams as set forth in claim 5 wherein the lower end of the movable gripping piece is pivoted on a part of the delivery device so that the movable gripping piece can be inclined, and wherein when the movable gripping piece is inclined in a direction separating from the fixed gripping piece, the upper end of the movable gripping piece is retreated below the lower ends of the flanges of the wide flange beam.

7. A multiple spindle drilling machine for wide flange beams as set forth in claim 5 wherein said operating device is a hydraulic cylinder.

* * * * *